United States Patent
Park et al.

(10) Patent No.: US 10,341,972 B2
(45) Date of Patent: Jul. 2, 2019

(54) METHOD FOR TIME SYNCHRONIZATION OF DOMAIN BASED ON TIME INFORMATION OF VEHICLE

(71) Applicants: Hyundai Motor Company, Seoul (KR); Kia Motors Corporation, Seoul (KR); Industry-University Cooperation Foundation Hanyang University, Seoul (KR)

(72) Inventors: Seong Jin Park, Gyeonggi-do (KR); Woo Sub Kim, Gyeonggi-do (KR); SungKwon Park, Seoul (KR); Ju Ho Lee, Seoul (KR)

(73) Assignees: Hyundai Motor Company, Seoul (KR); Kia Motors Corporation, Seoul (KR); Industry-University Cooperation Foundation Hanyang University, Seoul (KR)

( * ) Notice: Subject to any disclaimer, the term of this patent is extended or adjusted under 35 U.S.C. 154(b) by 232 days.

(21) Appl. No.: 15/392,175

(22) Filed: Dec. 28, 2016

(65) Prior Publication Data
US 2017/0195982 A1    Jul. 6, 2017

(30) Foreign Application Priority Data
Jan. 6, 2016 (KR) .................. 10-2016-0001326

(51) Int. Cl.
*H04W 56/00* (2009.01)
*H04B 1/3822* (2015.01)

(52) U.S. Cl.
CPC ....... *H04W 56/0015* (2013.01); *H04B 1/3822* (2013.01)

(58) Field of Classification Search
CPC .................. H04W 56/0015; H04B 1/3822
See application file for complete search history.

(56) References Cited

U.S. PATENT DOCUMENTS

| | | | |
|---|---|---|---|
| 8,000,725 B2 * | 8/2011 | Alexander | G01S 5/02 455/411 |
| 2016/0087900 A1 * | 3/2016 | Kolmanic | H04L 12/40117 370/235.1 |
| 2017/0366287 A1 * | 12/2017 | Zeng | H04W 56/00 |
| 2018/0213499 A1 * | 7/2018 | Lee | H04W 56/00 |
| 2018/0270776 A1 * | 9/2018 | Yasukawa | H04W 56/0025 |

* cited by examiner

*Primary Examiner* — Walter J Divito
(74) *Attorney, Agent, or Firm* — Mintz Levin Cohn Ferris Glovsky and Popeo, P.C.; Peter F. Corless

(57) ABSTRACT

A time synchronization method performed by a communication node in a vehicle includes: receiving, from a road side unit (RSU), a first frame including time information of a first domain to which the RSU belongs; setting a time of the vehicle based on a time indicated by the time information of the first domain; and transmitting a second frame including the time information of the vehicle.

14 Claims, 12 Drawing Sheets

METHOD FOR TIME SYNCHRONIZATION OF DOMAIN BASED ON TIME INFORMATION OF VEHICLE

CROSS-REFERENCE TO RELATED APPLICATION

This application claims priority to and the benefit of Korean Patent Application No. 10-2016-0001326, filed on Jan. 6, 2016 in the Korean Intellectual Property Office (KIPO), the entire contents of which are incorporated by reference as if fully set forth herein.

BACKGROUND

1. Technical Field

The present disclosure relates generally to methods for time synchronization of domains, and more specifically, to methods for time synchronization of independent domains based on time information of vehicle.

2. Description of the Related Art

The number and variety of electronic devices installed within vehicles have increased significantly along with the rapid digitalization of vehicle parts. Electronic devices may currently be used throughout the vehicle, such as in a power train control system (including, e.g., an engine control system, an automatic transmission control system, or the like), a body control system (including, e.g., a body electronic equipment control system, a convenience apparatus control system, a lamp control system, or the like), a chassis control system (including, e.g., a steering apparatus control system, a brake control system, a suspension control system, or the like), a vehicle network (including, e.g., a controller area network (CAN), a FlexRay-based network, a media oriented system transport (MOST)-based network, or the like), a multimedia system (including, e.g., a navigation apparatus system, a telematics system, an infotainment system, or the like), and so forth.

Such systems and electronic devices constituting each of the above systems are connected via the vehicle network, which supports functions of the electronic devices. For instance, the CAN may support a transmission rate of up to 1 Mbps and may support automatic retransmission of colliding messages, error detection based on a cycle redundancy interface (CRC), or the like. The FlexRay-based network may support a transmission rate of up to 10 Mbps and may support simultaneous transmission of data through two channels, synchronous data transmission, or the like. The MOST-based network is a communication network for high-quality multimedia, which may support a transmission rate of up to 150 Mbps.

Meanwhile, the telematics system, the infotainment system, as well as enhanced safety systems of the vehicle, require higher transmission rates and system expandability. However, the CAN, FlexRay-based network, and the like may not sufficiently support such requirements. The MOST-based network may support a higher transmission rate than the CAN and the FlexRay-based networks. However, costs associated with applying the MOST-based network in all vehicle networks can be expensive. Due to these limitations, an Ethernet-based network is often adopted as a vehicle network. The Ethernet-based network may support bi-directional communication through one pair of windings and may support a transmission rate of up to 10 Gbps.

Meanwhile, domains supporting a generalized precision time protocol (gPTP) in an industrial system may be classified into universal time domains and working clock domains. The working clock domains may be synchronized with the universal time domain. However, in a case that a working clock domain exists independently without any physical connection with the universal time domain, the working clock domain cannot be synchronized with the universal time domain.

SUMMARY

The present disclosure provides techniques for time synchronization of an independent domain using time information of a vehicle.

In accordance with embodiments of the present disclosure, a time synchronization method performed by a communication node in a vehicle includes: receiving, from a road side unit (RSU), a first frame including time information of a first domain to which the RSU belongs; setting a time of the vehicle based on a time indicated by the time information of the first domain; and transmitting a second frame including the time information of the vehicle.

Further, the first frame may include an identifier indicating a type of the first domain and position information of the first domain.

Further, the method may further include setting the time of the vehicle based on the time information of the first domain when the first domain is a universal time domain.

Also, the method may further include measuring a link delay time between the communication node and the RSU, and the time of the vehicle may be set to a sum of the time indicated by the time information of the first domain and the measured link delay time.

Further, the RSU may be a grand master node of the first domain.

Further, the method may further include: receiving the first frame through a service channel between the vehicle and the first domain; and transmitting the second frame through a service channel between the vehicle and a second domain.

Further, the second frame may include an identifier indicating a type of the first domain, update time information indicating a time at which the time of the vehicle is updated, and position information of the first domain.

Further, the method may further include transmitting the second frame when the vehicle is located within a second domain.

Also, the second domain may be a working clock domain.

Furthermore, in accordance with embodiments of the present disclosure, a time synchronization method performed by a road side unit (RSU) of a working clock domain includes: receiving, from a communication node in a vehicle, a synchronization frame including time information of the vehicle; and setting a time of the RSU based on a time indicated by the time information of the vehicle. Time indicated by the time information of the vehicle is synchronized with time of a universal time domain.

Also, the method may further comprise measuring a link delay time between the RSU and the communication node, and the time of the RSU may be set to a sum of the time indicated by the time information of the vehicle and the measured link delay time.

Further, the method may further include receiving the synchronization frame through a service channel between the working clock domain and the vehicle.

Further, the synchronization frame may include update time information indicating a time at which the time of the vehicle is updated, an identifier of the universal time domain, and position information of the universal time domain.

Also, the method may further include setting the time of the RSU based on a time indicated by a synchronization frame having a latest update time among a plurality of synchronization frames when the plurality of synchronization frames are received.

Also, the method may further include setting the time of the RSU based on a synchronization frame from a universal time domain closest to the RSU among a plurality of synchronization frames when the plurality of synchronization frames are received.

Further, the RSU may be a grand master node of the working clock domain.

According to embodiments of the present disclosure, a vehicle may obtain time information of a universal time domain, and set its time based on the obtained time information. Therefore, the time of the vehicle can be synchronized with the time of the universal time domain. After being synchronized with the universal time domain, the vehicle may notify the synchronized time information. Then, working clock domains can obtain the notified time information, and set their time based on the obtained time information. Thus, the working clock domains can be synchronized with the universal time domain.

BRIEF DESCRIPTION OF DRAWINGS

Embodiments of the present disclosure will become more apparent by describing in detail forms of the present disclosure with reference to the accompanying drawings, in which.

Figure 1:
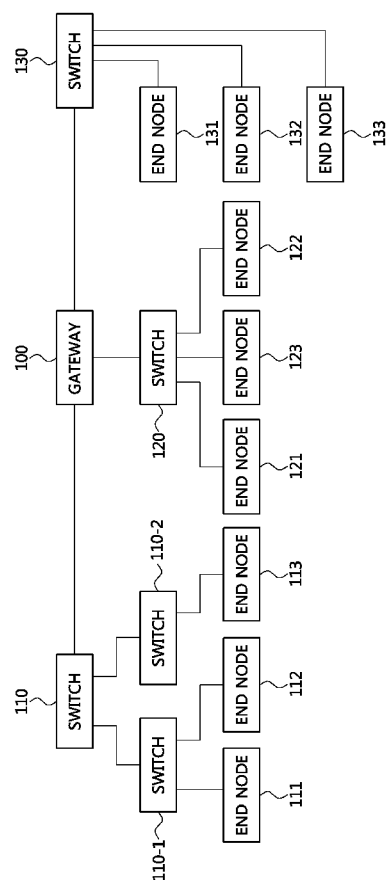
FIG. 1 is a diagram showing a vehicle network topology according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, forms of the present disclosure will be described in detail with reference to the accompanying drawings. As those skilled in the art would realize, the described forms may be modified in various different ways, all without departing from the spirit or scope of the present disclosure. Further, throughout the specification, like reference numerals refer to like elements.

The terminology used herein is for the purpose of describing particular forms only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g., fuels derived from resources other than petroleum).

Although forms are described herein as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules, and the processor is specifically configured to execute said modules to perform one or more processes which are described further below. Moreover, it is understood that the units or modules described herein may embody a controller/control unit for controlling operation of the unit or module.

Further, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Since the present disclosure may be variously modified and have several forms, specific embodiments will be shown in the accompanying drawings and be described in detail in the detailed description. It should be understood, however, that it is not intended to limit the present disclosure to the specific embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without being departed from the scope of the present disclosure and the second component may also be similarly named the first component. The term 'and/or' means any one or a combination of a plurality of related and described items.

When it is mentioned that a certain component is "coupled with" or "connected with" another component, it should be understood that the certain component is directly "coupled with" or "connected with" to the other component or a further component may be located therebetween. In contrast, when it is mentioned that a certain component is "directly coupled with" or "directly connected with" another component, it will be understood that a further component is not located therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms (including technical and scientific terms) used herein have the same meaning as commonly understood by one of ordinary skill in the art to which this disclosure belongs. Terms such as terms that are generally used and have been in dictionaries should be construed as having meanings matched with contextual meanings in the art. In this description, unless defined clearly, terms are not ideally, excessively construed as formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

FIG. 1 is a diagram showing a vehicle network topology according to embodiments of the present disclosure.

As shown in FIG. 1, a communication node included in the vehicle network may be a gateway, a switch (or bridge), or an end node. The gateway 100 may be connected with at least one switch 110, 110-1, 110-2, 120, and 130 and may be configured to connect different networks. For example, the gateway 100 may support connection between a switch which supports a controller area network (CAN) (e.g., FlexRay, media oriented system transport (MOST), local interconnect network (LIN), etc.) protocol and a switch which supports an Ethernet protocol. Each of the switches 110, 110-1, 110-2, 120, and 130 may be connected to at least one of end nodes 111, 112, 113, 121, 122, 123, 131, 132, and 133. Each of the switches 110, 110-1, 110-2, 120, and 130 may interconnect the end nodes 111, 112, 113, 121, 122, 123, 131, 132, and 133, and control at least one of end nodes 111, 112, 113, 121, 122, 123, 131, 132, and 133 connected to the switch.

The end nodes 111, 112, 113, 121, 122, 123, 131, 132, and 133 may include an electronic control unit (ECU) configured to control various types of devices mounted within a vehicle. For example, the end nodes 111, 112, 113, 121, 122, 123, 131, 132, and 133 may include the ECU included in an infotainment device (e.g., a display device, a navigation device, an around view monitoring device, etc.).

The communication nodes (e.g., a gateway, a switch, an end node, or the like) included in the vehicle network may be connected in a star topology, a bus topology, a ring topology, a tree topology, a mesh topology, or the like. In addition, the communication nodes of the vehicle network may support the CAN protocol, the FlexRay protocol, the MOST protocol, the LIN protocol, or the Ethernet protocol. Forms of the present disclosure may be applied to the foregoing network topologies. The network topology to which forms of the present disclosure may be applied is not limited thereto and may be configured in various ways.

Figure 2:
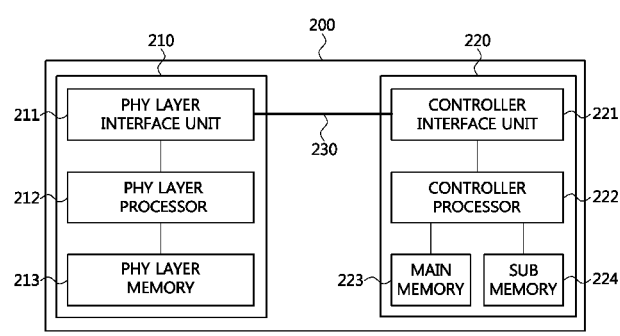
FIG. 2 is a diagram showing a communication node constituting a vehicle network according to embodiments of the present disclosure.

FIG. 2 is a diagram showing a communication node constituting a vehicle network according to embodiments of the present disclosure. Notably, the various methods discussed herein below may be executed by a controller having a processor and a memory.

As shown in FIG. 2, a communication node 200 of a network may include a PHY layer unit 210 and a controller unit 220. In addition, the communication node 200 may further include a regulator (not shown) for supplying power. In particular, the controller unit 220 may be implemented to include a medium access control (MAC) layer. A PHY layer unit 210 may be configured to receive or transmit signals from or to another communication node. The controller unit 220 may be configured to control the PHY layer unit 210 and perform various functions (e.g., an infotainment function, or the like.). The PHY layer unit 210 and the controller unit 220 may be implemented as one system on chip (SoC), or alternatively may be implemented as separate chips.

Further, the PHY layer unit 210 and the controller unit 220 may be connected via a media independent interface (MII) 230. The MII 230 may include an interface defined in the IEEE 802.3 and may include a data interface and a management interface between the PHY layer unit 210 and the controller unit 220. One of a reduced MII (RMII), a gigabit MII (GMII), a reduced GMII (RGMII), a serial GMII (SGMII), a 10 GMII (XGMII) may be used instead of the MII 230. A data interface may include a transmission channel and a reception channel, each of which may have an independent clock, data, and a control signal. The management interface may include a two-signal interface, one signal for the clock and one signal for the data.

Particularly, the PHY layer unit 210 may include a PHY layer interface unit 211, a PHY layer processor 212, and a PHY layer memory 213. The configuration of the PHY layer unit 210 is not limited thereto, and the PHY layer unit 210 may be configured in various ways. The PHY layer interface unit 211 may be configured to transmit a signal received from the controller unit 220 to the PHY layer processor 212 and transmit a signal received from the PHY layer processor 212 to the controller unit 220. The PHY layer processor 212 may be configured to execute operations of the PHY layer interface unit 211 and the PHY layer memory 213. The PHY layer processor 212 may be configured to modulate a signal to be transmitted or demodulate a received signal. The PHY layer processor 212 may be configured to control the PHY layer memory 213 to input or output a signal. The PHY layer memory 213 may be configured to store the received signal and output the stored signal based on a request from the PHY layer processor 212.

The controller unit 220 may be configured to monitor and control the PHY layer unit 210 using the MII 230. The controller unit 220 may include a controller interface unit 221, a controller processor 222, a main memory 223, and a sub memory 224. The configuration of the controller unit 220 is not limited thereto, and the controller unit 220 may be configured in various ways. The controller interface unit 221 may be configured to receive a signal from the PHY layer unit 210 (e.g., the PHY layer interface unit 211) or an upper layer (not shown), transmit the received signal to the controller processor 222, and transmit the signal received from the controller processor 222 to the PHY layer unit 210 or upper layer. The controller processor 222 may further include an independent memory control logic or an integrated memory control logic for controlling the controller interface unit 221, the main memory 223, and the sub memory 224. The memory control logic may be implemented to be included in the main memory 223 and the sub memory 224 or may be implemented to be included in the controller processor 222.

Further, each of the main memory 223 and the sub memory 224 may be configured to store a signal processed by the controller processor 222 and may be configured to output the stored signal based on a request from the controller processor 222. The main memory 223 may be a volatile memory (e.g., a random access memory (RAM)) configured to temporarily store data required for the operation of the controller processor 222. The sub memory 224 may be a non-volatile memory in which an operating system code (e.g., a kernel and a device driver) and an application program code for performing a function of the controller unit 220 may be stored. A flash memory having a high processing speed, a hard disc drive (HDD), or a compact disc-read only memory (CD-ROM) for large capacity data storage may be used as the non-volatile memory. Typically, the controller processor 222 may include a logic circuit having at least one processing core. A core of an Advanced RISC Machines (ARM) family or a core of an Atom family may be used as the controller processor 222.

A method performed by a communication node and a corresponding counterpart communication node in a vehicle network will be described below. Although the method (e.g., signal transmission or reception) performed by a first communication node will be described below, the method is applicable to a second communication node that corresponds to the first communication node. In other words, when an operation of the first communication node is described, the second communication node corresponding thereto may be configured to perform an operation that corresponds to the operation of the first communication node. Additionally, when an operation of the second communication node is described, the first communication node may be configured to perform an operation that corresponds to an operation of a switch.

Figure 3:
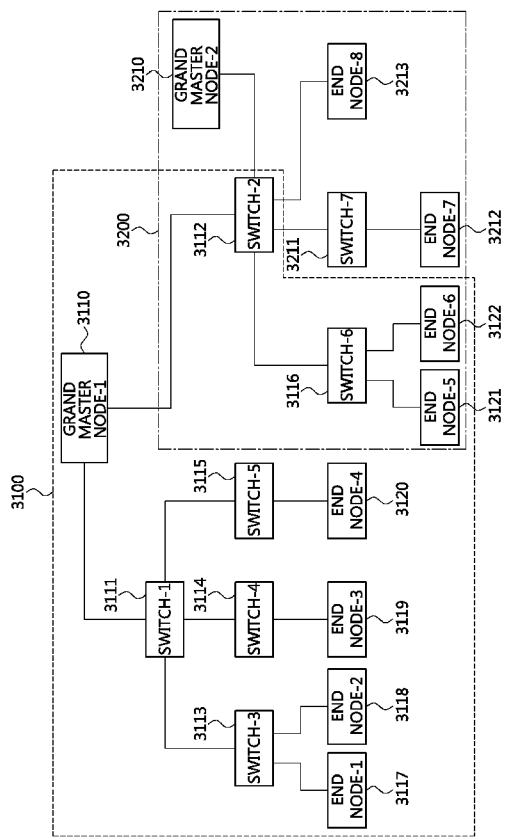
FIG. 3 is a conceptual view showing an example of a time-aware network.

FIG. 3 is a conceptual view showing an example of a time-aware network.

As shown in FIG. 3, a time-aware network may support IEEE 802.1AS (e.g., a generalized precision time protocol (gIP), or the like), and may comprise a universal time domain 3100, and a working clock domain 3200. Here, gPTP operations and time scales of respective domains may be independent from each other. Each of the domains belonging to the time-aware network may have its unique number (i.e., unique identifier). For example, the unique number may a value in a range of 0 to 127. However, the range of the unique number is not limited to the above example. That is, the range may exceed 127. In an industrial system, the unique number of the universal time domain 3100 may be set to '0,' and the unique number of the working clock domain may be set to one of 1 to 127. The domain, in the industrial system, may represent a country, a city, or a specific area belonging to a city.

Each of the universal time domain 3100 and the working clock domain 3200 may comprise a plurality of communication nodes. Also, communications nodes 3112, 3116, 3121, and 3122 belonging to both of the domains 3100 and 3200 may exist. A communication node may be a grand master node, a switch (or, bridge), or an end node. The communication nodes may be connected physically.

In the universal time domain 3100, a first grand master node 3110 may be a communication node in an uppermost level. The first grand master node 3110 may support a global positioning system (GPS). For example, the first grand master node 3110 may use the GPS to identify its position and notify its identified position. The communication nodes belonging to the universal time domain 3100 may operate based on time of the first grand master node 3110. For example, the communication nodes belonging to the universal time domain 3100 may be synchronized with the first grand master node 3110.

The first grand master node 3110 may be connected with a first switch 3111 and a second switch 3112. Also, the first switch 3111 may be connected to a third switch 3113, a fourth switch 3114, and a fifth switch 3115. The second switch 3112 may be connected to a second grand master node 3210, a sixth switch 3116, a seventh switch 3117, an eighth end node 3213. The third switch 3113 may be connected to a first end node 3117 and a second end node 3118. The fourth switch 3114 may be connected to a third end node 3119, and the fifth switch 3115 may be connected to a fourth end node 3120. The sixth switch 3116 may be connected to a fifth end node 3121 and a sixth end node 3122.

In the working clock domain 3200, the second grand master node 3210 may be a communication node in an uppermost level. The second grand master node 3210 may be synchronized with the first grand master node 3110. That is, the time of the working clock domain 3200 may be synchronized with the time of the universal time domain 3100. Alternatively, the time of the working clock domain 3200 may be configured based on an oscillator of the corresponding area. The communication nodes belonging to the working clock domain 3200 may operate based on the time of the second grand master node 3210. The second grand master node 3210 may be connected to the second switch 3112. The second switch 3112 may be connected to the first grand master node 3110, the sixth switch 3116, the seventh switch 3211, and the eighth end node 3213. The seventh switch 3211 may be connected to the seventh end node 3212.

The time-aware network may have various configurations without being restricted to the above example. In the time-aware network, domains may be arranged as follows.

Figure 4:
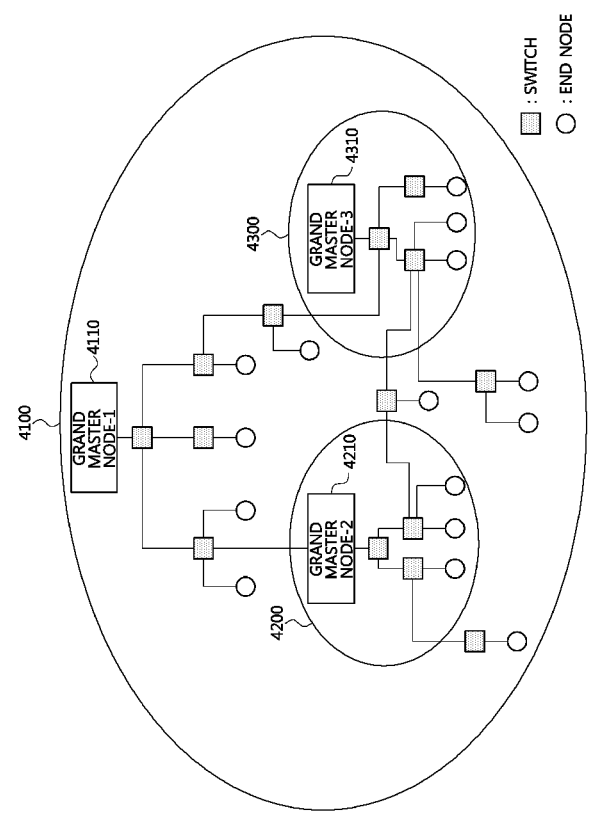
FIG. 4 is a conceptual view showing an example of arrangement of domains.

FIG. 4 is a conceptual view showing an example of arrangement of domains.

As shown in FIG. 4, a programmable logic controller (PLC) based factory network may comprise a plurality of domains 4100, 4200, and 4300. A universal time domain 4100 may comprise a first working clock domain 4200 and a second working clock domain 4300. The communication nodes included in the universal time domain 4100 may operate based on time of a first grand master node 4110. The first working clock domain 4200 may be connected physically to the universal time domain 4100. For example, a second grand master node 4210 may be physically connected to a switch included in the universal time domain 4100. In this case, the second grand master node 4210 may be synchronized with the first grand master node 4110, and the communication nodes in the first working clock domain 4200 may operate based on time of the second grand master node 4210. Alternatively, the communication nodes include in the first working clock domain 4200 may operate based on time independent from that of the universal time domain 4100. The first working clock domain 4200 may be physically connected to the second working clock domain 4300.

The second working clock domain 4300 may be physically connected to the universal time domain 4100. For example, switches included in the second working clock domain 4300 may be physically connected to switches included in the universal time domain 4100. In this case, a second grand master node 4310 may be synchronized with the first grand master node 4110, and the communication nodes included in the second working clock domain 4300 may operate based on time of the third grand master node 4310. Alternatively, the communication nodes included in the second working clock domain 4300 may operate based on time independent from that of the universal time domain 4100.

Figure 5:
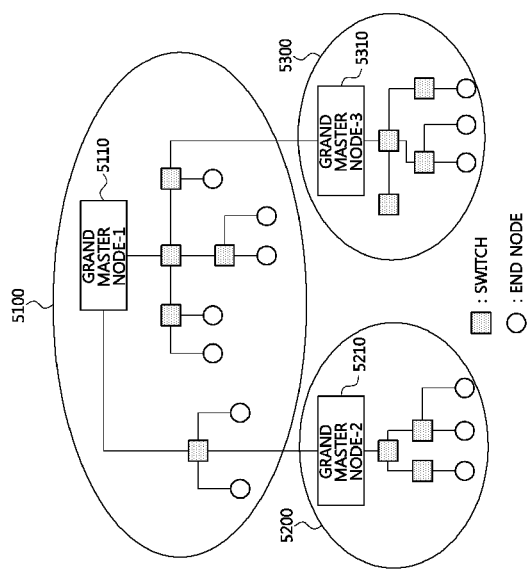
FIG. 5 is a conceptual view showing another example of arrangement of domains.

FIG. 5 is a conceptual view showing another example of arrangement of domains.

As shown in FIG. 5, a PLC based factory network may comprise a plurality of domains 5100, 5200, and 5300. The plurality of working clock domains 5100, 5200, and 5300 may be connected to each other. For example, a second grand master node 5210 of the second working clock domain 5200 may be connected with a switch included in the first working clock domain 5100, and a third grand master node 5310 of the third working clock domain 5300 may be connected to a switch included in the first working clock domain 5100. In this case, the first working clock domain 5100 may operate as a primary domain, and the second working clock domain 5200 and the third working clock domain 5300 may operate as sub domains.

Thus, the second grand master node 5210 may be synchronized with the first grand master node 5110, and communication nodes included in the second working clock domain 5200 may operate based on time of the second grand master node 5210. A third grand master node 5310 may be synchronized with the first grand master node 5110, and communication nodes included in the third working clock domain 5300 may operate based on time of the third grand master node 5310.

Alternatively, the working clock domains 5100, 5200, and 5300 may be separated from each other. In this case, the working clock domains 5100, 5200, and 5300 may operate based on independent times, and accordingly synchronization among them may not be established. Meanwhile, in the case that synchronization among domains in the time-aware factory network is not acquired, the nodes belonging to the factory network may malfunction.

On the other hand, a wireless access in vehicular environment (WAVE) is an intelligent transportation system (ITS) communication technology for providing high-speed vehicles with communication services, and modified to be suitable for vehicular environments from a wireless local area network (WLAN) technology. The WAVE may support a vehicle-to-infrastructure (V2I) or vehicle-to-vehicle (V2V) communication which is a type of dedicated short range communication (DSRC) technologies.

IEEE 802.11a/g, which is one of the conventional WLAN technologies, may be suitable to indoor environments, and does not support mobility. On the contrary, the WAVE can support mobility, and support reliable communications even in outdoor environments where interferences due to Doppler shifts exist. For example, the WAVE can support a fast link connection between an on-board unit (OBU) installed in a vehicle moving at a velocity up to maximum of 160 Km/h and a road-side unit (RSU) installed in road side, and high-speed data communications up to 27 Mbps. The WAVE has the following layers.

Figure 6:
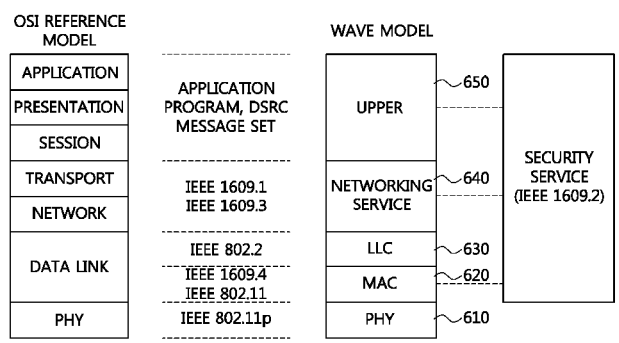
FIG. 6 is a conceptual view showing layers of WAVE.

FIG. 6 is a conceptual view showing layers of WAVE.

As shown in FIG. 6, the WAVE model may comprise a physical (PHY) layer 610, a medium access control (MAC) layer 620, a logical link control (LLC) layer 630, a networking service layer 640, and an upper layer 650. The PHY layer 610 may support IEEE 802.11p, etc., and correspond to a PHY layer according to an open system interconnection (OSI) reference model. The MAC layer 620 may support IEEE 1609.4, IEEE 802.11, etc., and correspond to a data link layer according to the OSI reference model. The LLC layer 630 may support IEEE 802.2, etc., and correspond to a data link layer according to the OSI reference model.

The networking service layer 640 may support IEEE 1609.1, IEEE 1609.3, or the like, and correspond to a network layer and a transport layer according to the OSI reference model. The upper layer 650 may support application programs, a DSRC message set, or the like, and correspond to a session layer, a presentation layer, and an application layer according to the OSI reference model. The MAC layer 620, networking service layer 640, and upper layer 650 may support security services defined in IEEE 1609.2.

Meanwhile, the IEEE 802.11p is a standard for V2V communications, and may interoperate with the IEEE 1609 series standards defining a channel access procedure of a vehicle in a multi-channel environment. The channels for V2V communications are defined in the IEEE 802.11p as follows.

Figure 7:
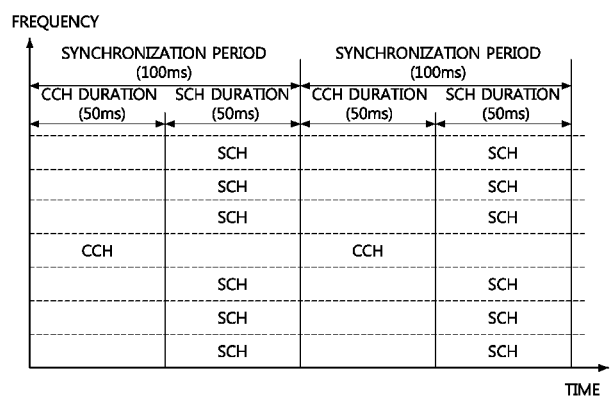
FIG. 7 is a conceptual view showing IEEE 802.11p channels for V2V communications.

FIG. 7 is a conceptual view showing IEEE 802.11p channels for V2V communications.

As shown in FIG. 7, a synchronization period may have the length of 100 ms. 50 ms of the synchronization period may be configured to be a control channel (CCH) duration, and the rest 50 ms of the synchronization period may be configured to be a service channel (SCH) duration. A single CCH may be configured in the CCH duration, and a frame comprising control information, management information, safety-related information, high priority information, etc. may be transmitted through the CCH. For example, multi-channel synchronization information, channel access information, vendor-specific information, master information block (MIB) maintenance information, readdressing information, other IEEE 802.11 service information, or the like may be transmitted through the CCH. Six SCHs may be configured in the SCH duration, and user information, data, or the like may be transmitted through the SCHs.

Meanwhile, frames can be transmitted and received in the IEEE 802.11p as follows.

Figure 8:
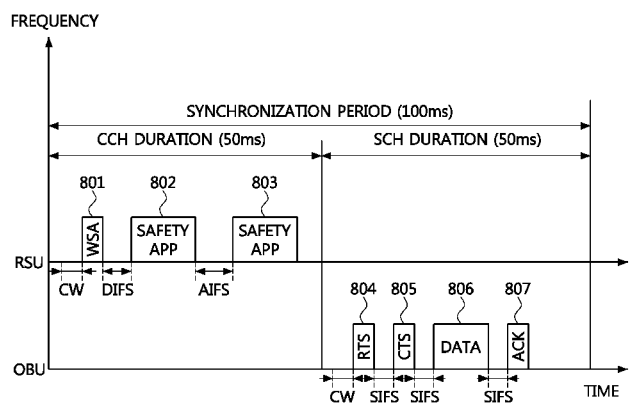
FIG. 8 is a timing diagram showing frame transceiving procedure in IEEE 802.11p.

FIG. 8 is a timing diagram showing frame transceiving procedure in IEEE 802.11p.

As shown in FIG. 8, in a case that a CCH is in idle state in the CCH duration, a RSU may perform a random backoff procedure. For example, in a case that the CCH is maintained in the idle state during a contention window (CW) duration according to the random backoff procedure, the RSU may transmit a WAVE service advertisement (WSA) frame 801 through the CCH. Also, the RSU may transmit a safety application (APP) related frame 802 through the CCH after a lapse of a distributed interface space (DIFS) from an end point of the WSA frame 801. Also, the RSU may transmit a safety APP related frame 803 through the CCH after a lapse of an arbitration interframe space (AIFS) from an end point of the safety APP related frame 802.

Meanwhile, in a case that a SCH is in idle state in the SCH duration, an OBU may perform a random backoff procedure. For example, in a case that the SCH is maintained in the idle state during a CW duration according to the random backoff procedure, the OBU may transmit a request-to-send (RTS) frame 804 through the SCH. The OBU may receive a clear-to-send (CTS) frame 805 from one of other communication nodes (e.g., an RSU or another OBU, etc.) after a lapse of a SIFS from an end point of the RTS frame 804. Also, the OBU may transmit a data frame 806 through the SCH after a lapse of a SIFS from an end point of the CTS frame 805. The OBU may receive an acknowledgement (ACK) frame 807 through the SCH after a lapse of a SIFS from an end point of the data frame 806. In a case that the OBU successfully receives the ACK frame 807 in response to the data frame 806, the OBU may determine that the data frame 806 has been successfully received at the corresponding communication node.

Meanwhile, the communication nodes (e.g., the OBU, the RSU, etc.) may perform communications based on a WAVE short message protocol (WSMP). For example, V2I communications between RSU and OBU may be performed based on the WSMP, and V2V communications between OBUs may also be performed based on the WSMP. The WSPM used for the communications between communication nodes will be described.

Figure 9:
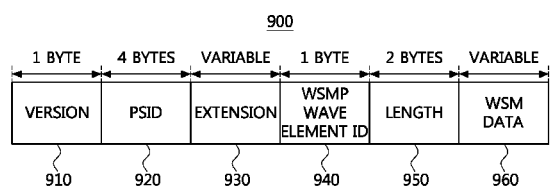
FIG. 9 is a block diagram showing a WSMP frame.

FIG. 9 is a block diagram showing a WSMP frame.

As shown in FIG. 9, a WSMP frame 900 may comprise a WSMP header and a WSM data field 960. A user data having the length of at most 512 bytes may be transmitted through the WSMP frame 900. Also, the WSMP header may comprise a version field 910, a provider service identifier (PSID) field 920, an extension field 930, a WSMP WAVE element identifier (ID) field 940, and a length field 950. The version field may have the length of 1 byte, and indicate a version of WSMP. The PSID field may have the length of 4 bytes, and include an identifier of a service provided by a service provider.

The extension field 930 may comprise information on a channel number, a transmission rate, a transmission power, or the like, and the length of the extension field 930 may be variable. The WSMP WAVE element ID field 940 may have the length of 1 byte, and include an identifier of WAVE elements. The length field 950 may have the length of 2 bytes, and indicate the length of the WSM data field 960. The WSM data field 960 may comprise data used by an upper layer, and the length of the WSM data field may be variable.

On the other hand, for time synchronization of the above-described domains, the domains should be physically connected with each other. Therefore, a domain existing independently without a physical connection (hereinafter, referred to as an "independent domain") may not be synchronized with other domains. However, when a communication node with mobility (e.g., a communication node included in a vehicle) exists, the communication node may notify its domain time information, and communication nodes belonging to the domain may be synchronized based on the notified time information. In the below description, a time synchronization method by a communication node with mobility will be explained.

Figure 10:
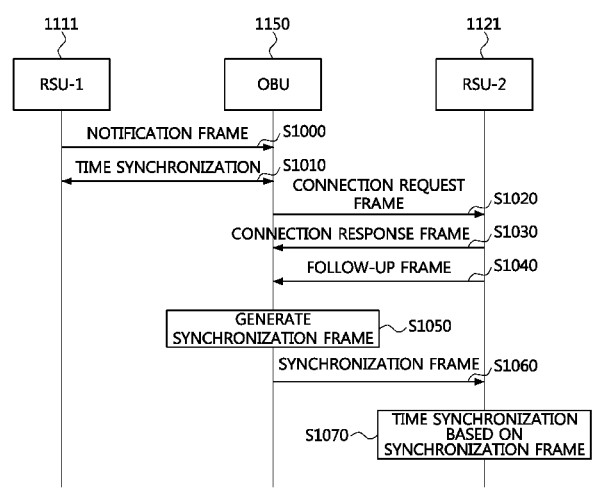
FIG. 10 is a sequence chart showing a time synchronization method according to embodiments of the present disclosure.
Figure 11:
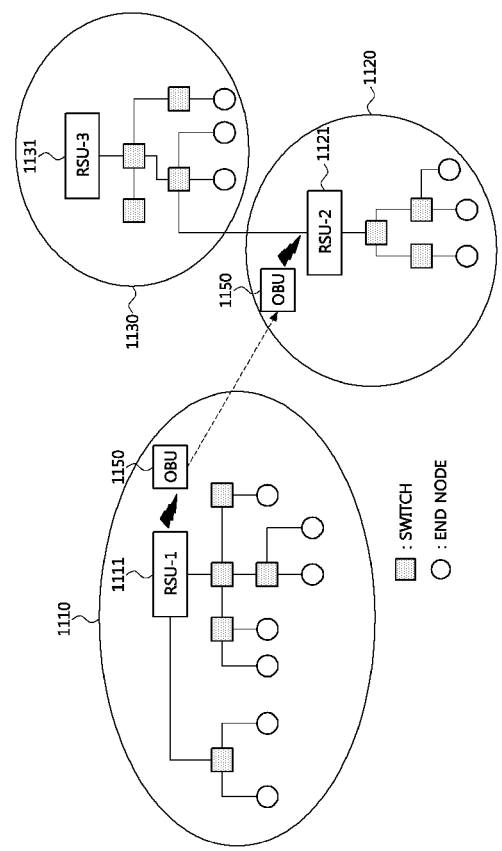
FIG. 11 is a conceptual view showing embodiments of a network to which the time synchronization method is applied.
Figure 12:
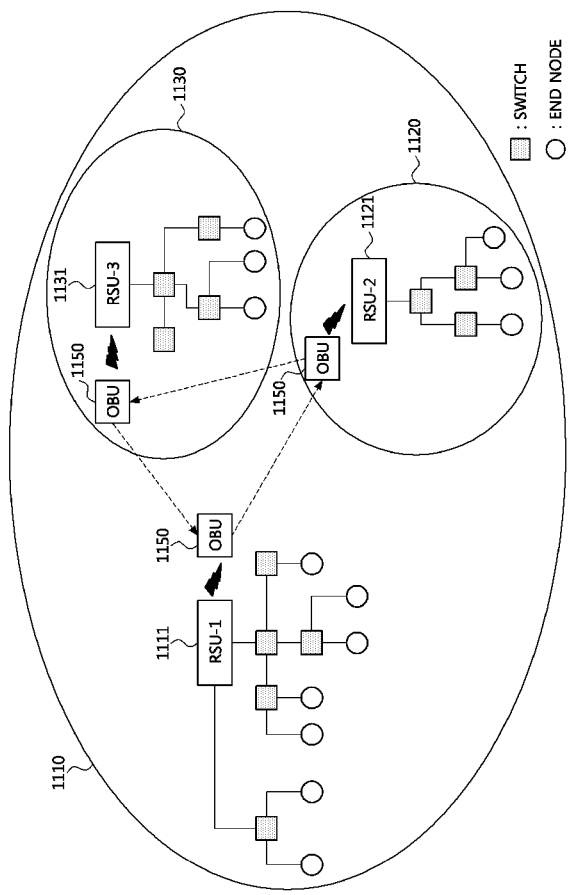
FIG. 12 is an additional conceptual view showing embodiments of a network to which the time synchronization method is applied.

FIG. 10 is a sequence chart showing a time synchronization method according to embodiments of the present disclosure, FIG. 11 is a conceptual view showing embodiments of a network to which the time synchronization method is applied, and FIG. 12 is an additional conceptual view showing embodiments of a network to which the time synchronization method is applied.

As shown in FIGS. 10 to 12, a network may comprise a universal time domain 1110, a first working clock domain 1120, and a second working clock domain 1130. The domains 1110, 1120, and 1130 may exist independently from each other without physical connections. A first RSU 1111 may be a grand master node of the universal time domain 1110, a second RSU 1121 may be a grand master node of the first working clock domain 1120, and a third RSU 1131 may be a grand master node of the second working clock domain 1130. The OBU 1150 may be a communication node having mobility. For example, the OBU 1150 may be a communication node included in a vehicle, and the vehicle may form a domain.

The first RSU 1111 may generate a notification frame including time information indicating its time (e.g., reference time). Also, the notification frame may further comprise information on a position of the first RSU 1111 (e.g., latitude and longitude). For example, when the first RSU 1111 supports GPS, the first RSU 1111 may identify its position through the GPS, and generate the notification frame by using the identified position. Also, the notification frame may further comprise priority information (e.g., type identifier) indicating the type of the domain to which the first RSU 1111 belongs. For example, since the first RSU 1111 belongs to the universal time domain 1110, the priority information of the notification frame of the first RSU 1111 may be set to '0.'

The notification frame may be generated based on the WSMP, and the time information, position information, and priority information may be included in a WSM data field of the notification frame. Here, the time information of the first RSU 1111 indicates time information of the universal time domain 1110, the position information of the first RSU 1111 indicates position information of the universal time domain 1110. The first RSU 1111 may transmit the notification frame periodically or non-periodically (S1000). The notification frame may be transmitted through a CCH or a SCH between the first RSU 1111 and the OBU 1150.

When the OBU 1150 is located within communication coverage of the first RSU 1111, the OBU 1150 can receive the notification frame from the first RSU 1111, and perform a time synchronization procedure with the first RSU 1111 based on the received notification frame (S1010). The time synchronization procedure between the OBU 1150 and the first RSU 1111 may be performed as follows.

Figure 13:
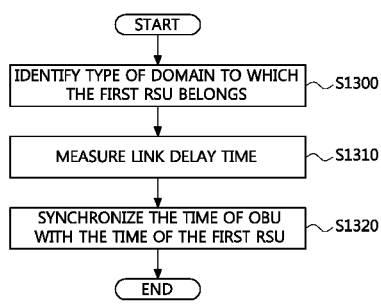
FIG. 13 is a flow chart showing a time synchronization procedure in an OBU.

FIG. 13 is a flow chart showing a time synchronization procedure in an OBU.

As shown in FIG. 13, the OBU 1150 may obtain the priority information from the notification frame, and identify the type of the domain to which the first RSU 1111 belongs based on the obtained priority information (S1300). For example, in the case that the priority information is set to '0,' the OBU 1150 may determine that the first RSU 1111 belongs to the universal time domain. In the case that the first RSU 1111 belongs to the universal time domain, the OBU 1150 may obtain the time information and the position information of the universal time domain from the notification frame. On the contrary, in the case that the priority information is set to one of '1' to '7,' the OBU 1150 may determine that the first RSU 1111 belongs to a working clock domain. In the case that the first RSU 1111 belongs to the working clock domain, the OBU 1150 may discard the received notification frame.

In the case that the first RSU 1111 belongs to the universal time domain, the OBU 1150 may measure a link delay time with the first RSU 1111 (S1310). For example, the OBU 1150 may transmit a delay request frame to the first RSU 1111, and record a transmission time of the delay request frame (hereinafter, 'RSU1$_{time1}$'). The first RSU 1111 may receive the delay request frame the OBU 1150, and record a reception time of the delay request frame (hereinafter, 'RSU1$_{time2}$'). The first RSU 1111 may transmit a delay response frame including information indicating the RSU1$_{time2}$ to the OBU 1150, record a transmission time of the delay response frame (hereinafter, 'RSU1$_{time3}$'), and transmit a follow-up frame including information indicating the RSU1$_{time3}$ to the OBU 1150. The follow-up message may be transmitted immediately after the transmission of the delay response frame.

The OBU 1150 may receive the delay response frame from the first RSU 1111, record the reception time of the delay response frame (hereinafter, 'RSU1$_{time4}$'), and obtain the RSU1$_{time2}$ from the delay response frame. Also, the OBU 1150 may receive the follow-up frame from the first RSU 1111, and obtain the RSU1$_{time3}$ from the follow-up frame. The frames used for the link delay time measurement may be transmitted through a CCH or SCH between the OBU 1150 and the first RSU 1111. The OBU 1150 may measure the link delay time between the OBU 1150 and the first RSU 1111 based on the following Equation 1.

$$\text{link delay time} = \frac{(RSU1_{time2} - RSU1_{time1}) + (RSU1_{time4} - RSU1_{time3})}{2} \quad \text{[Equation 1]}$$

Alternatively, in the case that the OBU 1150 supports GPS, the OBU 1150 may identify its position using the GPS, and identify the position information of the first RSU 1111 from the notification frame. In this case, the OBU 1150 may calculate a distance between the OBU 1150 and the first RSU 1111 based on the positions of the OBU 1150 and the first RSU 1111, and estimate the link delay time between the OBU 1150 and the first RSU 1111.

The OBU 1150 may set its time based on a value of 'time indicated by the time information of the notification frame+ link delay time' (S1320). Therefore, the time of the OBU 1150 may be synchronized with the time of the universal time domain 1110. Here, the procedure of measuring the link delay time may be skipped. In this case, the OBU 1150 may set its time simply with the time indicated by the time information of the notification frame.

Referring again to FIGS. 10 to 12, the vehicle including the OBU 1150 may move. When the vehicle moves into another domain, the OBU 1150 may transmit a connection request frame to the corresponding domain (e.g., the second RSU 1121 belonging to the first working clock domain 1120) (S1020). Also, the OBU 1150 may record a transmission time of the connection request frame (hereinafter, 'RSU2$_{time1}$'). For example, the OBU 1150 supporting GPS may identify its position change according to the movement of the vehicle by using the GPS, and determine that the vehicle has moved into another domain based on the identified position. Alternatively, the OBU 1150 may measure a strength of a signal received from the first RSU 1111, and may determine that the vehicle has moved into other domain when the measured strength of the signal is equal to or less than a predetermined threshold. The connection request frame may include an identifier of the OBU 1150, and may be generated based on the WSMP. The connection request frame may be transmitted through a CCH or SCH between the OBU 1150 and the second RSU 1121.

The second RSU 1121 may receive the connection request frame the OBU 1150, and record a reception time of the connection request frame (hereinafter, 'RSU2$_{time2}$'). The second RSU 1121 may generate a connection response frame including information indicating the RSU2$_{time2}$. Also, the connection response frame may further include priority information and position information of the working clock domain 1120 to which the second RSU 1121 belongs, and SCH-related information (e.g., information on a frequency resource and time resource in which the SCH is configured). The priority of the first working clock domain 1120 may be set to one of '1' to '7.' The connection response frame may be generated based on the WSMP, and a WSM data field may comprise the information indicating the RSU2$_{time2}$, the priority information, the position information, and the SCH-related information.

The second RSU 1121 may transmit the connection response frame to the OBU 1150 (S1030). Also, the second RSU 1121 may record a transmission time of the connection response frame (hereinafter, 'RSU2$_{time3}$'), generate a follow-up frame including information indicating the RSU2$_{time3}$, and transmit the generated follow-up frame to the OBU 1150 (S1040). The follow-up frame may be transmitted immediately after the transmission of the connection response frame. The connection response frame and the follow-up frame may be transmitted through a CCH or SCH between the OBU 1150 and the second RSU 1121.

The OBU 1150 may receive the connection response frame from the second RSU 1121, record a reception time of the connection response frame (hereinafter, 'RSU2$_{time4}$'), and obtain the RSU2$_{time2}$ from the connection response frame. Also, the OBU 1150 may receive the follow-up frame from the second RSU 1121, and obtain the RSU2$_{time3}$ included in the follow-up frame. The OBU 1150 may measure the link delay time between the OBU 1150 and the second RSU 1121 based on the following Equation 2.

$$\text{link delay time} = \frac{(RSU2_{time2} - RSU2_{time1}) + (RSU2_{time4} - RSU2_{time3})}{2} \quad \text{[Equation 2]}$$

Alternatively, in the case that the OBU 1150 supports GPS, the OBU 1150 may identify its position using the GPS, and identify the position information of the second RSU 1121 from the connection response frame. In this case, the OBU 1150 may calculate a distance between the OBU 1150 and the second RSU 1121 based on the positions of the OBU 1150 and the second RSU 1121, and estimate the link delay time between the OBU 1150 and the second RSU 1121.

The OBU 1150 may generate a synchronization frame (S1050). For example, in the case that a working clock domain to which the second RSU 1121 belongs is an independent domain, the OBU 1150 may generate the synchronization frame. The synchronization frame may be generated based on the WSMP, and constructed as follows.

Figure 14:
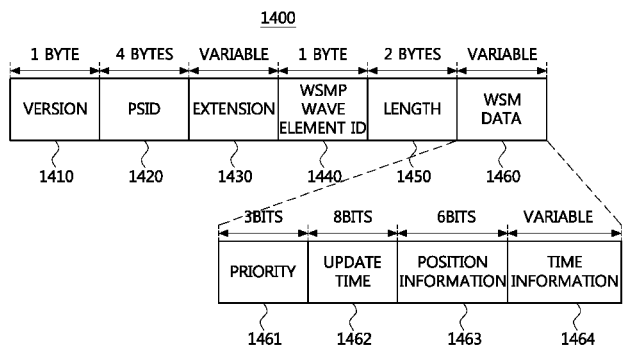
FIG. 14 is a block diagram showing a synchronization frame according to embodiments of the present disclosure.

FIG. 14 is a block diagram showing a synchronization frame according to embodiments of the present disclosure.

As shown in FIG. 14, a synchronization frame 1400 may comprise a WSMP header and a WSM data field 1460. A user data having the length of at most 512 bytes may be transmitted through the synchronization frame 1400. Also, the WSMP header may comprise a version field 1410, a PSID field 1420, an extension field 1430, a WSMP WAVE element ID field 1440, and a length field 1450. The fields included in the WSMP header of the synchronization frame 1400 may be identical to or similar with those of the WSMP header of the WSMP frame 900 explained referring to FIG. 9.

The WSM data field 1460 may comprise a priority information field 1461, an update time field 1462, a position information field 1463, and a time information field 1464. The length of the WSM data field 1460 may be variable. The priority information field 1461 may have the length of 3 bits, and indicate the type of a domain to which the RSU time-synchronized with the OBU belongs. For example, the priority information field 1461 may have a value of '0' to '7.' The priority field 1461 configured as '0' may indicate that the domain of the RSU is the universal time domain, and the priority field 1461 configured as one of '1' to '7' may indicate that the domain of the RSU is a working clock domain.

The update time field 1462 may have the length of 8 bits, and indicate a time at which the time of the OBU was updated. The position information field 1463 may have the length of 6 bits, and indicate the position information (i.e., position information of the domain to which the RSU belongs) of the RSU time-synchronized with the OBU. The position information may comprise information of latitude and longitude. The time information field 1464 may indicate the time of the OBU. The length of the time information field 1464 may be variable.

Referring again to FIGS. 10 to 12, the priority information field 1461 of the synchronization frame may indicate the type of the universal time domain to which the first RSU 1111 belongs, the update time field 1462 may indicate the time at which the time of OBU 1150 became synchronized with the time of the first RSU 1111, the position information field 1463 may indicate the position of the first RSU 1111, and the time information field 1464 may indicate the time of the OBU 1150. Also, the synchronization frame may further comprise information indicating the link delay time between the OBU 1150 and the second RSU 1121. The OBU 1150 may transmit the synchronization frame to the second RSU 1121 (S1060). The synchronization frame may be transmitted through a CCH or SCH between the OBU 1150 and the second RSU 1121. For example, the synchronization frame may be transmitted through a SCH indicated by the SCH-related information included in the connection response frame.

The second RSU 1121 may receive the synchronization frame from the OBU 1150, and perform time synchronization based on the information included in the synchronization frame (S1070). For example, the second RSU 1121 may identify the type of the domain from the priority information field 1261 of the synchronization frame. In the case that the type of the domain indicates the universal time domain, the second RSU 1121 may configure the time of the second RSU 1121 based on the time indicated by the time information field 1464 of the synchronization frame. Here, the second RSU 1121 may configure the time of the second RSU 1121 based on 'time indicated by the time information field 1464+link delay time.' Accordingly, the time of the working clock domain 1120 may be synchronized with the time of the universal time domain 1110.

Meanwhile, the second RSU 1121 having received multiple synchronization frames may perform time synchronization as follows.

Figure 15:
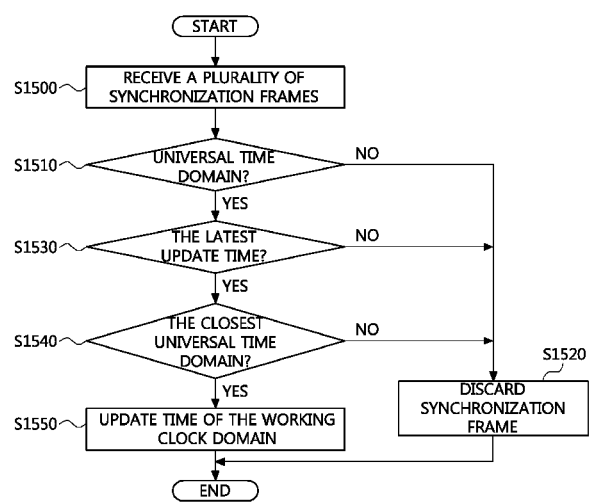
FIG. 15 is a flow chart showing a time synchronization method performed in an independent domain.

FIG. 15 is a flow chart showing a time synchronization method performed in an independent domain.

As shown in FIG. 15, the second RSU 1121 may receive a plurality of synchronization frames from a plurality of OBUs (S1500). The second RSU 1121 may identify types of the respective domains from the priority information fields included in the plurality of synchronization frames (S1510). For example, in the case that the priority information field of the received synchronization frame is set to '0,' the second RSU 1121 may identify the type of the domain to which the corresponding OBU belongs as the universal time domain. On the contrary, in the case that the priority information field of the received synchronization frame is set to a value of '1' to '7,' the second RSU 1121 may identify the type of the domain to which the corresponding OBU belongs as the working clock domain. In the case that the type of the domain is the working clock domain, the second RSU 1121 may discard the corresponding synchronization frame (S1520).

When a single synchronization frame including information indicating the universal time domain type exists, the second RSU 1121 may perform time synchronization of the second RSU 1121 based on the time information included in the corresponding synchronization frame (S1550). However, when a plurality of synchronization frames indicating the universal time domain type exist, the second RSU 1121 may identify update times indicated by the respective update time fields of the plurality of synchronization frames, and identify a synchronization frame having the latest update time (S1530). The second RSU 1121 may discard synchronization frames except the synchronization frame having the latest update time (S1520).

When a single synchronization frame having the latest update time exists, the second RSU 1121 may perform time synchronization of it based on the time information included in the corresponding synchronization frame (S1550). When a plurality of synchronization frames having the latest update time exist (i.e., a plurality of synchronization frames having the same update time exist), the RSU may identify positions of the respective OBUs based on position information fields of the plurality of synchronization frames. The second RSU 1121 may identify distances from the second RSU 1121 to the respective universal time domains based on the position information, and identify the synchronization frame of the closest universal time domain (S1540). The second RSU 1121 may discard synchronization frames except the synchronization frame of the closest universal time domain (S1520). The second RSU 1121 may perform time synchronization based on the time information included in the synchronization frame including information on the closest universal time domain (S1550).

In FIG. 11, the second RSU 1121 may be physically connected with the second working clock domain 1130. Accordingly the third RSU 1131 may obtain time information from the second RSU 1121, and set its time based on the time indicated by the obtained time information. Thus, the second working clock domain 1130 may be synchronized with the universal time domain 1110. In FIG. 12, the third RSU 1131 of the second working clock domain 1130 may receive the synchronization frame from the OBU 1150 in a manner identical or similar to the above-described method, and set its time according to the information included in the synchronization frame. Accordingly, the second working clock domain 1130 may be synchronized with the universal time domain 1110.

The methods according to embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software. Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the operation of the present disclosure, and vice versa.

While the embodiments of the present disclosure and their advantages have been described in detail above, it should be understood that various changes, substitutions and alterations may be made herein without departing from the scope of the disclosure.

What is claimed is:

1. A time synchronization method performed by a communication node in a vehicle, the method comprising:
    receiving, from a road side unit (RSU), a first frame including time information of a first domain to which the RSU belongs;
    setting a time of the vehicle based on a time indicated by the time information of the first domain; and
    transmitting a second frame including the time of the vehicle,
    wherein the second frame includes priority information indicating a type of the first domain, update time information indicating a time at which the time of the vehicle is updated, and position information of the first domain.

2. The time synchronization method according to claim 1, wherein the first frame includes an identifier indicating a type of the first domain and position information of the first domain.

3. The time synchronization method according to claim 1, further comprising setting the time of the vehicle based on the time information of the first domain when the first domain is a universal time domain.

4. The time synchronization method according to claim 1, further comprising measuring a link delay time between the communication node and the RSU, wherein the time of the vehicle is set to a sum of the time indicated by the time information of the first domain and the measured link delay time.

5. The time synchronization method according to claim 1, wherein the RSU is a grand master node of the first domain.

6. The time synchronization method according to claim 1, further comprising:
    receiving the first frame through a first service channel between the vehicle and the first domain; and
    transmitting the second frame through a second service channel between the vehicle and a second domain.

7. The time synchronization method according to claim 1, further comprising transmitting the second frame when the vehicle is located within a second domain.

8. The time synchronization method according to claim 7, wherein the second domain is a working clock domain.

9. A time synchronization method performed by a road side unit (RSU) of a working clock domain, the method comprising:
    receiving, from a communication node in a vehicle, a synchronization frame including time information of the vehicle; and
    setting a time of the RSU based on a time indicated by the time information of the vehicle, wherein
    the time indicated by the time information of the vehicle is synchronized with a time of a universal time domain, and
    the synchronization frame includes update time information indicating a time at which the time information of the vehicle is updated, an identifier of the universal time domain, and position information of the universal time domain.

10. The time synchronization method according to claim 9, further comprising measuring a link delay time between the RSU and the communication node, wherein the time of the RSU is set to a sum of the time indicated by the time information of the vehicle and the measured link delay time.

11. The time synchronization method according to claim 9, further comprising receiving the synchronization frame through a service channel between the working clock domain and the vehicle.

12. The time synchronization method according to claim 9, further comprising setting the time of the RSU based on a time indicated by a synchronization frame having a latest update time among a plurality of synchronization frames when the plurality of synchronization frames are received.

13. The time synchronization method according to claim 9, further comprising setting the time of the RSU based on a synchronization frame from a universal time domain closest to the RSU among a plurality of synchronization frames when the plurality of synchronization frames are received.

14. The time synchronization method according to claim 9, wherein the RSU is a grand master node of the working clock domain.

* * * * *